United States Patent [19]

Al-Sheikh et al.

[11] Patent Number: 4,544,178

[45] Date of Patent: Oct. 1, 1985

[54] COLLAPSIBLE PUSH CHAIR

[75] Inventors: Abdelraouf M. Al-Sheikh, Loughborough, England; Sakir T. Avci, Daire, Turkey; Kenneth S. Kelso, St. Albans, England; Seng H. Kwek, Singapore, Singapore; Lionel B. McBean, Birmingham, England; Stuart Pugh; Douglas G. Smith, both of Loughborough, England

[73] Assignee: Andrews Maclaren Limited, Northampton, England

[21] Appl. No.: 561,594

[22] PCT Filed: Mar. 31, 1983

[86] PCT No.: PCT/GB83/00098

§ 371 Date: Nov. 30, 1983

§ 102(e) Date: Nov. 30, 1983

[87] PCT Pub. No.: WO83/03393

PCT Pub. Date: Oct. 13, 1983

(Under 37 CFR 1.47)

[30] Foreign Application Priority Data

Mar. 31, 1983 [GB] United Kingdom ............... 8209556

[51] Int. Cl.$^4$ ............................................. B62B 7/08
[52] U.S. Cl. ................................... 280/642; 280/647; 280/658; 297/DIG. 4
[58] Field of Search ........ 280/642, 643, 644, 647–650, 280/47.38, 47.36; 297/17, 53, 54, DIG. 4, 48–50

[56] References Cited

U.S. PATENT DOCUMENTS

| | | | |
|---|---|---|---|
| 3,847,406 | 11/1974 | Burnham | 280/644 |
| 4,058,341 | 11/1977 | Prins | 297/48 |
| 4,191,397 | 3/1980 | Kassai | 280/647 |
| 4,398,748 | 8/1983 | Duvignacq | 280/658 |
| 4,412,688 | 11/1983 | Giordani | 280/658 |

Primary Examiner—Joseph F. Peters, Jr.
Assistant Examiner—Joseph G. McCarthy
Attorney, Agent, or Firm—Parkhurst & Oliff

[57] ABSTRACT

Two side frames support a seat assembly (25, 31 and 32) for a baby. Each side frame has first and second legs (1 and 2) pivotally connected at adjacent first ends (3 and 4) and a handle shaft (11). When the push chair is erected, with the second ends (5 and 6) of the legs (1 and 2) of each side frame spaced apart, the handle shaft (11) of each side frame is movable between first and second positions in which a handle bar (34) transversely interconnecting the handle shafts (11) is respectively behind the seat assembly (25, 31 and 32), for pushing the baby forwards, and in front of the seat assembly (25, 31 and 32), for pushing the baby backwards. The second leg (2) and the handle shaft (11) of each side frame are also connected by drive means (16 and 17) so that further movement of the handle shaft (11) from its second position to a third position laterally adjacent the first leg (1) is accompanied by corresponding movement of the second leg (2) towards a position laterally adjacent the first leg (1).

6 Claims, 6 Drawing Figures

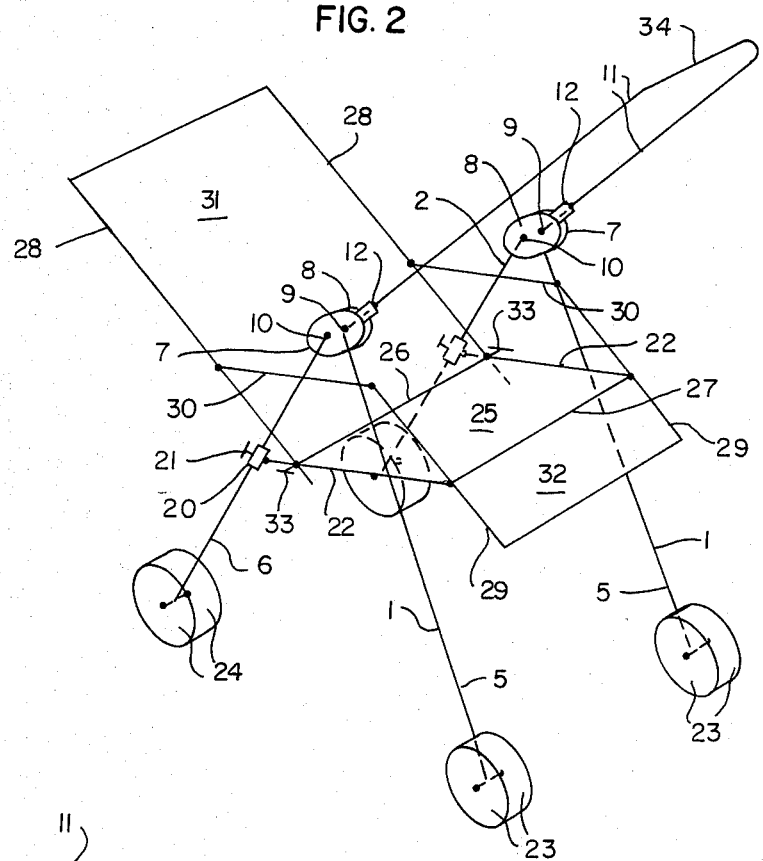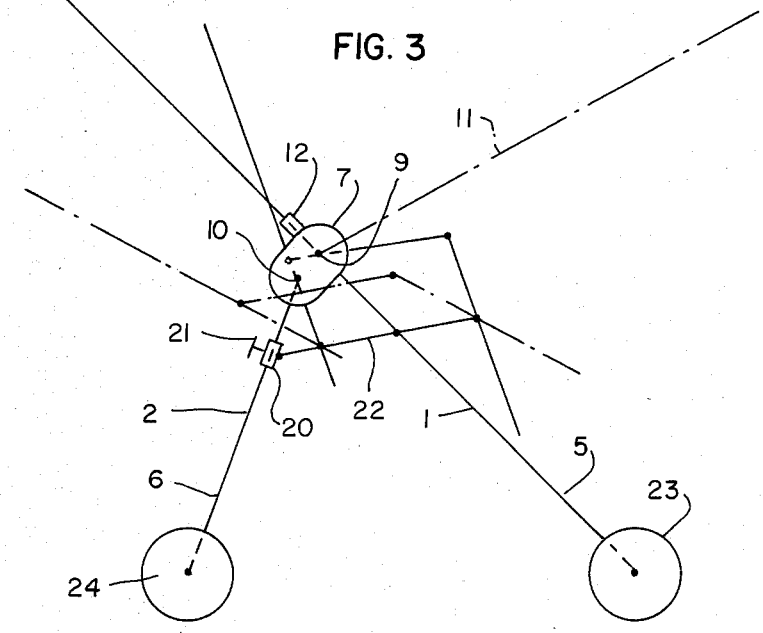

COLLAPSIBLE PUSH CHAIR

FIELD OF THE INVENTION

The invention relates to a collapsible push chair and, more specifically, to a push chair which can not only be changed from an erected condition to a collapsed condition, but one that has reversible handle shafts which, when the push chair is in its erected condition, can be arranged so that a baby carried in the push chair faces the person pushing the push chair or faces away from the person pushing the push chair, in the same direction as this person.

BACKGROUND ART

It is known to provide push chairs in which two transversely connected side frames each comprise first and second legs respectively provided with adjacent first ends and with second ends; pivot means providing articulation between the adjacent first ends of the first and second legs; and a handle shaft.

However, to reverse the handle shafts so as to push the push chair in the opposite direction, it is normally necessary to remove the handle shafts and to reconnect them to the remainder of the push chair, in a different position. In any case, reversing the handle shafts requires means additional to those provided for erecting and collapsing the push chair.

DISCLOSURE OF THE INVENTION

It is an object of the invention to provide a collapsible push chair in which means provided for folding the push chair between its erected and collapsed conditions are so constructed as to accommodate reversal of the handle shafts.

This is achieved by ensuring that the handle shaft of each side frame is pivotally connected to the pivot means of the side frame for movement between a first position, in which the handle shaft extends away from the first leg, and a third position, laterally adjacent the first leg, respectively on opposite sides of a second position in which the handle shaft extends away from the second leg; locking means are provided for releasably locking the handle shaft in said first and second positions; drive means interconnect the handle shaft and at least one of the first and second legs for relative movement of the first and second legs so that when the handle shaft is in said third position the first leg is laterally adjacent the second leg; and lost motion means permit movement of the handle shaft from the first position to the second position without movement of the first leg relative to the second leg.

It is therefore possible to pivotally move the handle shafts of the two side frames selectively to their first or second positions, for pushing the push chair from behind or from in front of a collapsible seat assembly supported by and interconnecting the two side frame. Moreover, the pivotal movement can be extended so as to move the handle shafts from their second positions to their third positions to effect collapse of the side frames and the collapsible seat assembly. This facilitates the folding of the collapsible push chair. Similarly, unfolding of the push chair into its erected condition is effected by movement of the handle shafts from their third positions to their first positions. The handle shafts can then be moved between their first and second positions without collapsing the push chair.

In one convenient form of construction, the drive means of each side frame interconnect the handle shaft and the second leg for pivotal movement of the second leg towards and into lateral proximity with the first leg as the handle shaft is pivotally moved from said second position to said third position.

Thus, in a preferred embodiment, the pivot means of each side frame comprise a hub at the first end of the first leg and first and second pivot pins supported by said hub; the handle shaft is pivotally mounted on the first pivot pin; the second leg is pivotally mounted on the second pivot pin; the drive means comprise a first gear sector pivotally mounted on the first pivot pin and a second gear sector, which is co-operable with the first gear sector, at the first end of the second leg; and the lost motion means comprise an arcuate slot formed in the first gear sector and a driving pin extending from the handle shaft and through the arcuate slot along an axis which is parallel to the axes of the first and second pivot pins.

Clearly, the diameters of the pitch circles of the first and second gear sectors are such that meshing movement between the gear sectors on movement of the handle shaft from its second position to its third position causes movement of the second leg from its fully extended position to its position laterally adjacent the first leg.

In an alternative form of construction, the drive means comprise two pulleys which are interconnected by an endless band arranged in the form of a "figure of eight" configuration such that rotation of one pulley causes the other pulley to rotate in the opposite direction. To increase the positive connection between the two pulleys, the band may be fastened to one or both of the pulleys or even replaced by two oppositely directed "S" shaped bands which are independently connected to the two pulleys. Here again, regardless of the band connection, the diameters of the pulleys are determined by the required angular movement of the handle shaft and the second leg and, in this case, the lost motion means include an arcuate slot formed in the pulley mounted on the pivot pin on which the handle shaft is also mounted.

The preferred embodiment also has the following features: a slider is mounted for movement along one of the first and second legs; a locking device is provided for locking the slider in a support position when the side frame is extended and the handle shaft is in its first position or its second position; and a seat support bar extends between the first and second legs and is pivotally connected to the slider mounted for movement along said one of the first and second legs and pivotally connected to the other of said first and second legs.

Thus, when the push chair is in its erected condition and the locking devices lock the slider in their support positions, the adjacent portions of the first and second legs of each side frame and the interconnecting portion of the seat support bar form a triangle and the bracing provided by the support bar ensures that there is no loading on the drive means interconnecting the first and second legs. When the push chair is to be collapsed, the locking devices are released and this allows each slider to move away from the first end and towards the second end of the leg to which it is fitted. On erection of the push chair, each slider moves in the opposite direction and is then locked in its support position.

Although the side frames can be arranged to fold so that the axes of the first and second legs and of the handle shaft lie in parallel planes perpendicular to the axes of the pivot pins supported by the hub of the pivot means, it has been found possible to fold the collapsible push chair into a sufficiently compact form even when the first and second legs and the handle shaft of each side frame have axes which lie in the same plane. With this form of construction, first and second wheel means may be mounted, respectively, on the second ends of the first and second legs; the second leg may be shorter than the first leg and connected to the pivot means so that, when the handle shaft is in its third position and the first leg is laterally adjacent the second leg, the second end of the first leg is spaced from the second end of the second leg and the first wheel means clear the second wheel means; and, when the handle shaft is in its third position and the first leg is laterally adjacent the second leg, the first and second wheel means may be disposed transversely of the first and second legs and the handle shaft.

This arrangement is particularly suitable when the wheel means each comprise two wheels mounted for rotation about a common axis on transversely opposite sides of the leg on which the wheels are mounted. This applies even when the wheel means include swivels for swivelling movement relative to the second ends of the legs on which they are mounted.

An embodiment of the invention is hereinafter described, by way of example only, with reference to the accompanying drawings.

BRIEF DESCRIPTION OF THE DRAWINGS

FIG. 2 is a perspective schematic view of the push chair shown in FIG. 1, but with the seat assembly in its lie-back condition and the handle bar in its second position so that a baby lying in the push chair faces rearwards, towards the person pushing the push chair;

FIG. 3 is an elevational view of the push chair arranged as shown in FIG. 1, but showing in dotted outline the seat assembly and a handle shaft in the condition these components are shown in FIG. 2;

MODE FOR CARRYING OUT THE INVENTION

Figure 1:
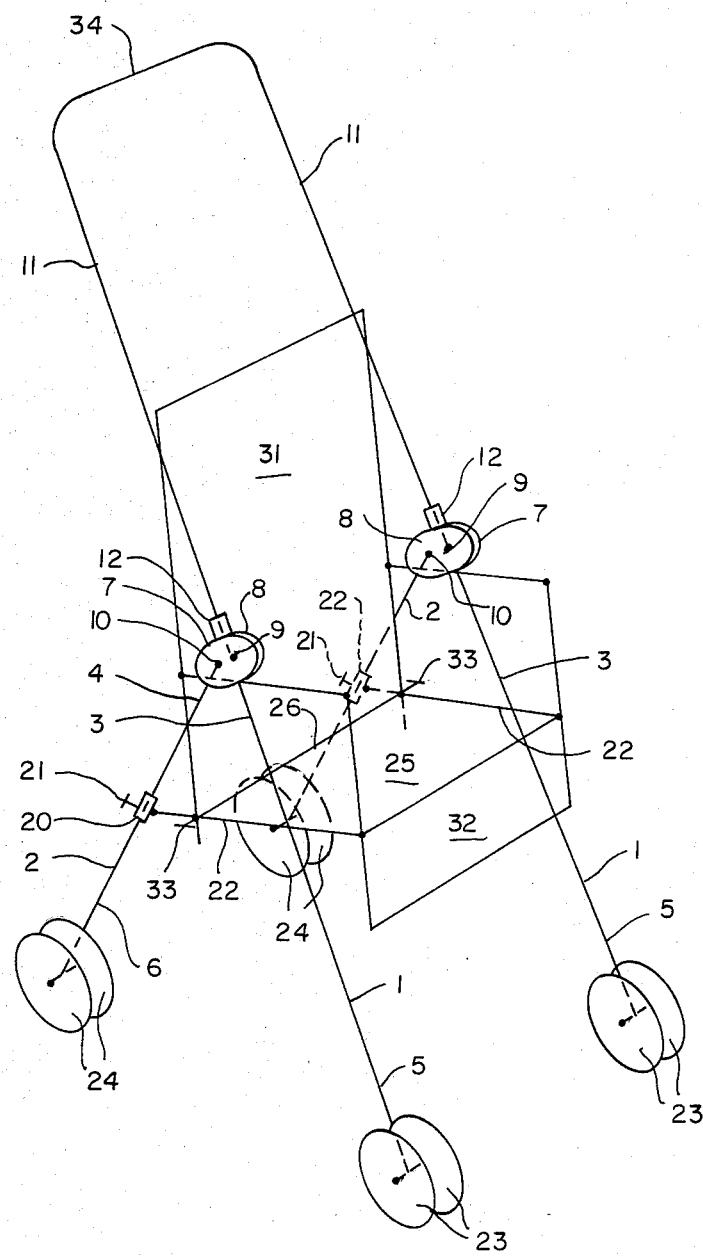
FIG. 1 is a perspective schematic view of a push chair according to the invention, with a seat assembly in an upright condition and a handle bar in a first position such that a baby seated in the push chair faces forwards, in the same direction as a person pushing the push chair.

As shown in FIGS. 1 to 3, a push chair according to the invention comprises two side frames which are transversely connected by a seat assembly. Each side frame comprises first and second legs 1 and 2 and a handle shaft 11 interconnected by pivot means in which, as shown more clearly in FIGS. 5 to 7, a hub comprising two hub plates 7 and 8 is integrally formed at the first end 3 of each first leg 1 and carries first and second pivot pins 9 and 10. The handle shaft 11 of each side frame is pivotally mounted on the first pivot pin 9 and the second leg 2 of each side frame is pivotally mounted on the second pivot pin 10. Wheel means 23,23 and 24,24 are mounted, respectively, on the second ends 5 and 6 of the first and second legs 1 and 2 of each side frame.

A seat support bar 22 extends between the first and second legs 1 and 2 of each side frame and is pivotally connected, at one end, to a slider 20 mounted for movement along the second leg 2, is pivotally connected to the first leg 1, and projects beyond the first leg 1. A locking device 21, shown schematically in FIGS. 1 to 3, locks the slider 20 in a support position, as shown in FIGS. 1 to 3, and the two seat support bars 22 support a seat 25.

The seat 25 has a rear edge 26 and a forward edge 27 and side edges provided by the forward portion of the two seat support bars 22. Each such forward portion of a seat support bar 22 forms part of a parallelogram linkage comprising a back rest support bar 28 and a further support bar 29, which are parallel to each other, and an arm rest 30 which is parallel to the seat support bar 22. A back rest 31 extends between the two back rest support bars 28 and a leg rest 32 extends between the lower portions of the two further support bars 29. A second locking device 33, shown schematically in FIGS. 1 and 2, releasably secures the seat assembly in the upright position shown in FIG. 1 and in full outline in FIG. 3 or in the lie-back condition shown in FIG. 2 and in dotted outline in FIG. 3. As also shown in FIGS. 1 and 2, the two side frames are also interconnected by a handle bar 34 extending between the free ends of the handle shafts 11.

Figure 6:
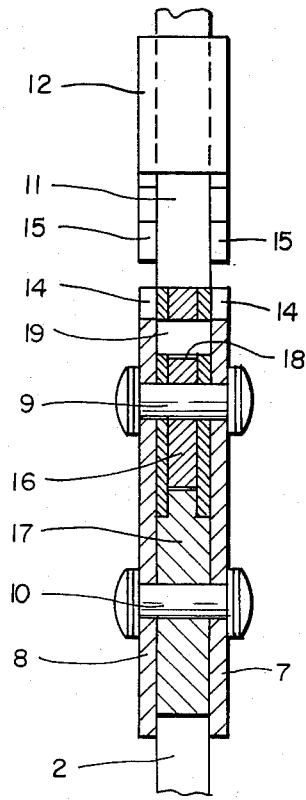
FIG. 6 is a sectional view taken across Section VI—VI in FIG. 5.
Figure 5:
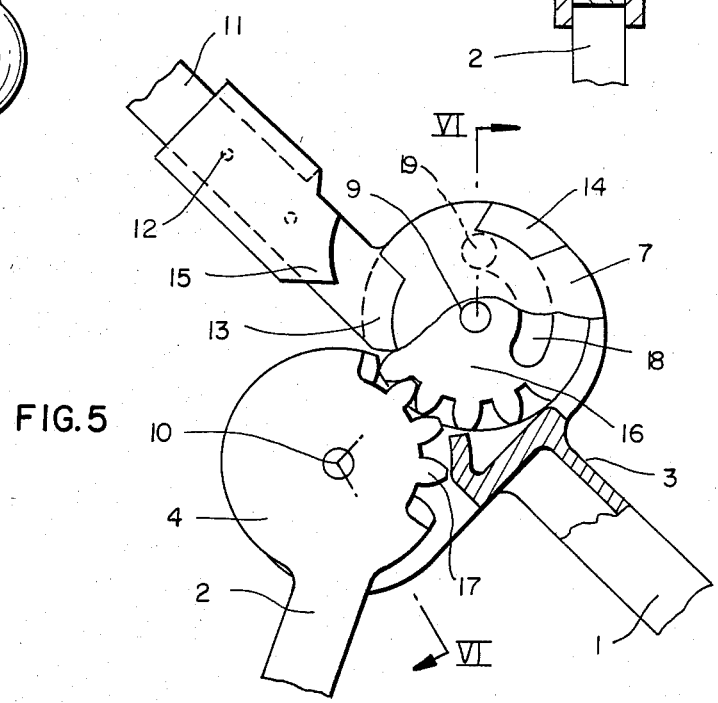
FIG. 5 is an elevational view of part of a side frame forming part of the push chair shown in the other figures.

As shown in FIGS. 5 and 6, a cranked end portion of each handle shaft 11 is pivotally connected to the first pivot pin 9 of the pivot means and is movable between first and second positions in which the handle shaft 11 extends, respectively, away from the first leg 1 and the second leg 2. Two spaced formations 13 and 14 are formed on each of the hub plates 7 and 8 and a sleeve 12 slidable on the handle shaft 11 has two formations 15 which are complementary with the formations 13 and with the formations 14 and engageable with these formations 13 and 14 to hold the handle shaft 11 respectively in its first and second positions.

As shown in FIG. 6, the cranked end of the handle shaft 11 is bifurcated and a first gear sector 16 is rotatably mounted on the first pivot pin 9, between the two bifurcations. An arcuate slot 18 is formed in a central boss portion of the first gear sector 16 and a driving pin 19 extends between the two bifurcations of the handle shaft 11 and through this arcuate slot 18 along an axis parallel to the axis of the first pivot pin 9 so as to allow the handle shaft 11 to move from its first position to its second position without causing movement of the first gear sector 16. However, on movement of the handle shaft 11 from its first position, beyond its second position, the first gear sector 16 causes a rotation of a second gear sector 17 formed integrally with the first end 4 of the second leg 2 so as to cause the second leg 2 to rotate about the second pivot pin 10 into a position in which the second leg 2 is laterally adjacent the first leg 1 when the handle shaft 11 moves into its third position in lateral proximity with the first leg 1, as shown in FIG. 4.

To re-erect the push chair, it is first necessary to rotate each handle shaft 11 in the opposite direction, until each driving pin 19 engages the opposite end of its arcuate slot 18. The handle shaft 11 is then moved to its first position so as to effect movement of the second leg 2 away from the first leg 1, into the extended condition of the push chair. If required, the handle shaft 11 is then moved to its second position.

Figure 4:
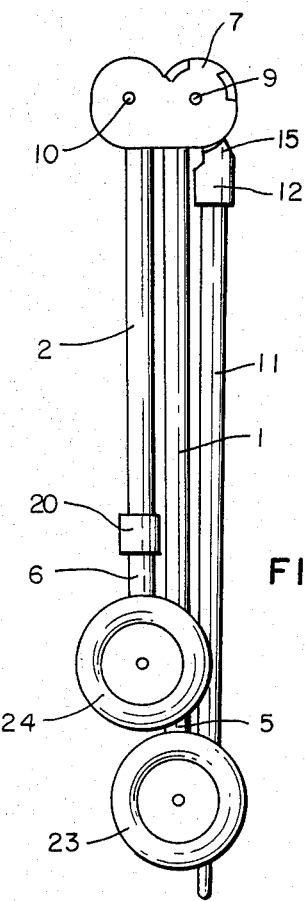
FIG. 4 is an elevational view of the push chair in its collapsed condition.

As shown in FIG. 4, the second leg 2 of each side frame is shorter than the first leg 1 and connected to the pivot means so that, when the handle shaft 11 is in its third position and the first leg 1 is laterally adjacent the second leg 2, the second end 5 of the first leg 1 is spaced from the second end 6 of the second leg 2 and the first wheel means 23,23 clear the second wheel means 24,24. More particularly, the wheel means 23,23 comprise two wheels 23 which lie on opposite sides of the first leg 1 and the handle shaft 11 and the wheel means 24,24 comprise two wheels 24 which lie on opposite sides of the first and second legs 1 and 2 and on opposite sides of the handle shaft 11.

To permit this folding of the push chair into it collapsed condition, it is necessary for the seat assembly to collapse by allowing the seat support bars 22 to swing towards the back rest support bars 28 and this is achieved by releasing the locking means 21 and permitting the sliders 20 to move towards the second ends 6 of the second legs 2, as shown in FIG. 4.

In a convenient mode of construction, the first and second legs 1 and 2, the handle shafts 11 and the first gear sector 16 are formed by die casting. Hub plates 7 and 8 are thus formed integrally with the first end 3 of each first leg 1 and a second gear sector 17 is formed integrally with the first end 4 of each second leg 2. This reduces the number of separate components and facilitates fabrication. Die-casting also facilitates the formation of members which vary in strength, along their length, in accordance with the applied loading.

We claim:

1. A collapsible push chair in which two transversely connected side frames each comprise:
    first and second legs (1 and 2) respectively provided with adjacent first ends (3 and 4) and with second ends (5 and 6);
    pivot means (7 to 10) providing articulation between the adjacent first ends (3 and 4) of the first and second legs (1 and 2); and
    a handle shaft (11);
    characterised in that:
    the handle shaft (11) is pivotally connected to said pivot means (7 to 10) for movement between a first position, in which the handle shaft (11) extends away from the first leg (1), and a third position, laterally adjacent the first leg (1), respectively on opposite sides of a second position in which the handle shaft (11) extends away from the second leg (2);
    locking means (12 to 15) are provided for releasably locking the handle shaft (11) in said first and second positions;
    drive means (16 and 17) interconnecting the handle shaft (11) and at least one of the first and second legs (1 and 2) for relative movement of the first and second legs (1 and 2) so that when the handle shaft (11) is in said third position the first leg (1) is laterally adjacent the second leg (2); and
    lost motion means (18 and 19) permitting movement of the handle shaft (11) from the first position to the second position without relative movement between the first and second legs (1 and 2).

2. A collapsible push chair, according to claim 1, in which the drive means (16 and 17) of each side frame interconnect the handle shaft (11) and the second leg (2) for pivotal movement of the second leg (2) towards and into lateral proximity with the first leg (1) as the handle shaft (11) is pivotally moved from said second position to said third position.

3. A collapsible push chair, according to claim 2, in which:
    the pivot means of each side frame comprise a hub (7 and 8) at the first end (3) of the first leg (1) and first and second pivot pins (9 and 10) supported by said hub (7 and 8);
    the handle shaft (11) is pivotally mounted on the first pivot pin (9);
    the second leg (2) is pivotally mounted on the second pivot pin (10);
    the drive means comprise a first gear sector (16) pivotally mounted on the first pivot pin (9) and a second gear sector (17), which is co-operable with the first gear sector (16), at the first end of the second leg (2); and
    the lost motion means comprise an arcuate slot (18) formed in the first gear sector (16) and a driving pin (19) extending from the handle shaft (11) and through the arcuate slot (18) along an axis which is parallel to the axes of the first and second pivot pins (9 and 10).

4. A collapsible push chair, according to claim 1, in which the locking means of each side frame comprise:
    a sleeve (12) mounted for movement along the handle shaft;
    two spaced formations (13 and 14) on the pivot means (7 to 10); and
    a complementary formation (15) on the sleeve (12) which is engageable with the two spaced formations (13 and 14) when the handle shaft (11) is in its first and second positions, respectively, to thereby lock the handle shaft (11) in these positions.

5. A collapsible push chair, according to claim 1, in which:
    a slider (20) is mounted for movement along one of the first and second legs (1 and 2) of each frame;
    a locking device (21) is provided for locking the slider (20) in a support position when the side frame is extended and the handle shaft (11) is in its first position or its second position; and
    a seat support bar (22) extends between the first and second legs (1 and 2) and is pivotally connected to the slider (20) mounted for movement along said one of the first and second legs (1 and 2) and to the other of said first and second legs (1 and 2).

6. A collapsible push chair, according to claim 1, in which:
    the first and second legs (1 and 2) and the handle shaft (11) of each side frame have axes which lie in the same plane;
    first wheel means (23,23) are mounted on the second ends (5) of the first legs (1);
    second wheel means (24,24) are mounted on the second ends (6) of the second legs (2);
    the second leg (2) of each side frame is shorter than the first leg (1) and connected to the pivot means (7 to 10) so that, when the handle shaft (11) is in its third position and the first leg (1) is laterally adjacent the second leg (2), the second end (5) of the first leg (1) is spaced from the second end (6) of the second leg (2) and the first wheel means (23,23) clear the second wheel means (24,24); and
    when the handle shaft (11) of each side frame is in its third position and the first leg (1) is laterally adjacent the second leg (2), the first and second wheel means (23,23 and 24,24) are disposed transversely of the first and second legs (1 and 2) and the handle shaft (11).

* * * * *